United States Patent [19]

Takada et al.

[11] Patent Number: 5,180,792
[45] Date of Patent: Jan. 19, 1993

[54] AMINE-CURED EPOXY RESIN WITH PHENOXYETHYL (METH) ACRYLATES

[75] Inventors: Tetuzi Takada, Kadoma; Nobuo Gotoh, Matsubara, both of Japan

[73] Assignee: Koei Chemical Co., Ltd., Osaka, Japan

[21] Appl. No.: 657,818

[22] Filed: Feb. 20, 1991

[30] Foreign Application Priority Data

Feb. 21, 1990 [JP] Japan .................................... 2-40318

[51] Int. Cl.$^5$ ..................... C08L 63/02; C08L 63/04
[52] U.S. Cl. ............................... 525/423; 525/486; 525/530; 525/524; 523/428; 523/457; 523/466
[58] Field of Search ................ 525/423, 530, 531, 486

[56] References Cited

U.S. PATENT DOCUMENTS

| | | | |
|---|---|---|---|
| 4,072,592 | 2/1978 | Du et al. | 525/529 |
| 4,075,411 | 2/1978 | Dickstein | 524/46 |
| 4,210,733 | 7/1980 | Hayashi et al. | 525/529 |
| 4,221,892 | 9/1980 | Baron et al. | 525/531 |
| 4,463,151 | 7/1984 | Schulz et al. | 526/307.5 |
| 4,501,853 | 2/1985 | Sugimori et al. | 525/529 |
| 5,096,938 | 3/1992 | Beck et al. | 525/530 |

Primary Examiner—Robert E. Sellers
Attorney, Agent, or Firm—Wenderoth, Lind & Ponack

[57] ABSTRACT

Disclosed is a curable epoxy resin composition which is effectively cured at ambient temperature and when cured has excellent adhesive strength and good water resistance. The epoxy resin composition comprises:

(a) an epoxy resin having at least two epoxy groups in one molecule,
(b) a monofunctional (meth)acrylate represented by

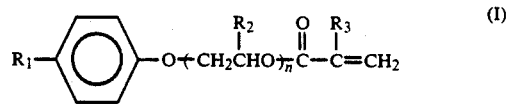

wherein $R_1$ represents a hydrogen atom or an alkyl group having 1 to 12 carbon atoms, $R_2$ and $R_3$ respectively represent a hydrogen atom or a methyl group, and n is an integer of 1 to 4, and (c) An amine curing agent selected from the group consisting of an aromatic polyamine, a modified aromatic polyamine, a polyamideamine and a mixture thereof. The present invention also provides an adhesive composition prepared from the above mentioned curable epoxy resin composition.

10 Claims, No Drawings

AMINE-CURED EPOXY RESIN WITH PHENOXYETHYL (METH) ACRYLATES

FIELD OF THE INVENTION

The present invention relates to a curable epoxy resin composition and an adhesive composition therefrom.

BACKGROUND OF THE INVENTION

Various type of curable epoxy resin compositions have been proposed and employed in many fields, especially adhesives because of the good adhesive performance of the epoxy resin compositions. For the adhesives, a curable epoxy resin composition which comprises an epoxy resin and an aromatic polyamine is mainly used because of low water absorption.

The epoxy resin composition, however, is requested to be heat-cured to obtain strong adhesive strength. The composition can be cured at ambient temperature, but it takes a relatively long time. The composition which has been cured at ambient temperature has poor adhesive strength under shear. The epoxy resin composition, accordingly, is not completely satisfied and used in limited fields.

In order to improve the adhesive strength under shear, it is proposed that a polyfunctional acrylate, such as polyethyleneglycol diacrylate, is formulated into the epoxy resin composition. The new formulation adversely increases water absorption and makes water resistance poor, thus being insufficient for adhesives.

SUMMARY OF THE INVENTION

The present invention provides a curable epoxy resin composition which is effectively cured at ambient temperature and when cured has excellent adhesive strength and good water resistance. The epoxy resin composition comprises;

(a) an epoxy resin having at least two epoxy groups in one molecule, (b) a monofunctional (meth)acrylate represented by

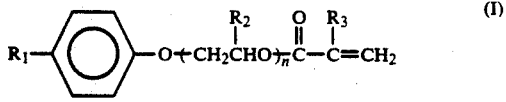

wherein $R_1$ represents a hydrogen atom or an alkyl group having 1 to 12 carbon atoms, $R_2$ and $R_3$ respectively represent a hydrogen atom or a methyl group, and n is an integer of 1 to 4, and (c) An amine curing agent selected from the group consisting of an aromatic polyamine, a modified aromatic polyamine, a polyamideamine and a mixture thereof.

The present invention also provides an adhesive composition prepared from the above mentioned curable epoxy resin composition.

DETAILED DESCRIPTION OF THE INVENTION

The epoxy resin used in the present invention is one having at least two epoxy groups in one molecule, including bisphenol A type epoxy resin, bisphenol AD type epoxy resin, bisphenol F type epoxy resin, phenol novolac type epoxy resin, cresol novolac type epoxy resin, a mixture thereof and the like.

In the formula (I), the alkyl group having 1 to 12 carbon atoms represented by $R_1$ includes methyl, ethyl, propyl, butyl, pentyl, hexyl, heptyl, octyl, nonyl, decyl, undecyl and dodecyl, which can be linear or branched Typical examples of the monofunctional (meth)acrylates represented by the formula (I) are 2-phenoxyethyl (meth)acrylate, 2-(2-phenoxyethoxy)ethyl (meth)acrylate, 2-[2-(2-phenoxyethoxy)ethoxy]ethyl (meth)acrylate, 2-[2-[2-(2-phenoxyethoxy)ethoxy]ethoxy]ethyl (meth)acrylate, 2-phenoxy-1-methylethyl (meth)acrylate, 2-(2-phenoxy-1-methylethoxy)-1-methylethyl (meth)acrylate, 2,-[2-(2-phenoxy-1-methylethoxy)-1-methylethoxy]-1-methylethyl (meth)acrylate, 2-[2-[2-(2-phenoxy-1-methylethoxy)-1-methylethoxy]-1-methylethoxy]-1-methylethyl (meth)acrylate, 2-(4-methylphenoxy)ethyl (meth)acrylate, 2-[2-(4-methylphenoxy)ethoxy]ethyl (meth)acrylate, 2-[2-[2-(4-methylphenoxy)ethoxy]ethoxy]ethyl (meth)acrylate, 2-[2-[2-[2-(4-methylphenoxy) ethoxy]ethoxy]ethoxy]ethyl (meth)acrylate, 2-(4-methylphenoxy)-1-methylethyl (meth)acrylate, 2-[2-(4-methylphenoxy)-1-methylethoxy]-1-methylethyl (meth)acrylate, 2-[2-[2-(4-methylphenoxy)-1-methylethoxy]-1-methylethoxy]-1-methylethyl (meth)acrylate, 2-[2-[2-[2-(4-methylphenoxy)-1-methylethoxy]-1-methylethoxy]-1-methylethoxy] -1-methylethyl (meth)acrylate, 2-(4-nonylphenoxy)ethyl (meth)acrylate, 2-[2-(-nonylphenoxy)-ethoxy]ethyl (meth)acrylate, 2-[2-[2-[4- nonylphenoxy) ethoxy]ethoxy]ethyl (meth)acrylate, 2-[2-[2-[2-(4-nonylphenoxy)ethoxy]ethoxy]ethoxy]ethyl (meth)acrylate, 2-(4-nonylphenoxy)-1-methylethyl (meth)acrylate, 2-[2-(4-nonylphenoxy)-1-methylethoxy]-1-methylethyl (meth)acrylate, 2-[2-[2-(4-nonylphenoxy)-1-methylethoxy]-1-methylethoxy]-1-methylethyl (meth)acrylate, 2[2-[2-[2-(4-nonylphenoxy)-1-methylethoxy]-1-methylethoxy]-1 -methylethoxy]-1-methylethyl (meth)acrylate, a mixture thereof and the like. The term "(meth)acrylate" means herein both acrylate and methacrylate.

The monofunctional (meth)acrylate represented by the formula (I) enhances the adhesive strength of the resulting resin composition and may be present in the composition in an amount of 10 to 200 parts by weight, preferably 15 to 150 parts by weight based on 100 parts by weight of the epoxy resin. Amounts outside the above range provide poor adhesive strength.

The monofunctional (meth)acrylate (I) may be prepared as follow. Phenol is alkylated to form a p-alkylphenol which is then reacted with ethylene oxide or propylene oxide to obtain a compound represented by

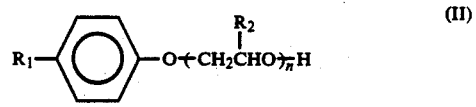

wherein $R_1$, $R_2$ and n are the same as mentioned above.

The compound (II) is then esterified with (meth)acrylic acid or a derivative thereof to obtain the monofunctional (meth)acrylate (I). The term "(meth)acrylic acid" means herein both acrylic acid and methacrylic acid.

The amine curing agent is an aromatic polyamine, a modified aromatic polyamine, a polyamideamine or a mixture thereof. The aromatic polyamine encompasses not only a normal aromatic polyamine but also a hydrogenated aromatic polyamine (i.e. an alicyclic polyamine), including aromatic polyamines (e.g. m-xylylenediamine, diaminodiphenylmethane and phenylenediamine) and alicyclic polyamines (e.g 1,3-bis-(aminomethyl)cyclohexane, 4,4'-diamino-dicyclohexylmethane and diaminocyclohexane). The modified aromatic polyamine is a Mannich modified aromatic amine, and an aromatic amine which is modified with mannich, methyl methacrylate, acrylonitrile, a urethane, an alkylene oxide and the like. The Mannich modified aromatic amine is prepared by reacting an aromatic amine, phenol and formaldehyde. The polyamideamine includes a compound obtained by reacting the above mentioned aromatic polyamine with dimer acid. The amine curing agent may be present in the composition in an amount of 60 to 150 equivalent %, preferably 70 to 130 equivalent %, based on the total amount of the epoxy equivalent of the epoxy resin and the (meth)acrylate equivalent of the monofunctional (meth)acrylate.

The curable epoxy resin composition of the present invention may contain additives which are known to the art, if necessary. Examples of the additives are a filler, a thickener, a leveling agent and the like. Examples of the fillers are calcium carbonate, calcium hydroxide, aluminum hydroxide, magnesium hydroxide, alumina, magnesia, diatomaceous earth, bentonite, kaolin, fused silica, talc, a mixture thereof and the like. The filler may be present in the composition in an amount of 5 to 200 % by weight, preferably 10 to 150 % by weight based on the total amount of the three components (a), (b) and (c).

EXAMPLES

The present invention is illustrated by the following examples, which are not to be construed as limiting the present invention to their details.

EXAMPLE 1

Preparation of Charge A

Charge A was prepared by mixing 60 parts by weight of an epoxy resin (Epicoat EP-828 available from Yuka Shell Co., Ltd.) and 40 parts by weight of 2-(4-nonylphenoxy)ethyl acrylate for three hours.

Preparation of a Curable Epoxy Resin Composition)

A curable epoxy resin composition was prepared by mixing 100 parts by weight of Charge A and 25 parts by weight of an amine curing agent (a polyamideamine obtained from m-xylenediamine and dimer acid).

Test for Determining Water Absorption of Cured Articles

The curable epoxy resin composition was cured at 23 ±1° C. for three days and the water absorption of the cured composition was determined according to JIS K 6911. The results are shown in Table 5.

Test for Determining Adhesive Performance of the Epoxy Composition (1) Tensile Shear Adhesive Strength Test pieces were prepared according to JIS K 6850 using plates which had been pretreated as Table 2 and the curable epoxy resin composition as an adhesive composition.

The test pieces were held at 23±1° C. for three days and then their tensile shear adhesive strength was determined according to JIS K 6850, using a test apparatus (Auto Graph AG 2000 C data treatment apparatus available from Shimadzu Corporation) The results are shown in Table 5.

(2) T Peel Strength

Test pieces were prepared according to JIS K 6854 using plates which had been pretreated as Table 3 and the curable epoxy composition as an adhesive composition.

The test pieces were held at 23±1° C. for three days and then their T peel strength was determined according to JIS K 6854, using a test apparatus (Auto Graph AG 2000 C data treatment apparatus available from Shimadzu Corporation). The results are shown in Table 5.

EXAMPLES 2 to 7

A curable epoxy resin composition was prepared by mixing Charge A obtained in Example 1 or the following Charge B and an amine curing agent (a) to (d) listed below.

Preparation of Charge B

Charge B was prepared by mixing for two hours in an automatic mortar 100 parts by weight of Charge A, 6 parts by weight of light calcium carbonate, 1 part by weight of a leveling agent (CABO-SIL TS-720 available from Tokyo Zairyo Co., Ltd.) and 8 parts by weight of talc.

(a) A Mannich modified m-xylenediamine prepared by reacting m-xylenediamine, phenol and formaldehyde
(b) A polyamideamine prepared from m-xylenediamine and dimer acid
(c) An adduct prepared by addition-reacting m-xylenediamine and propylene oxide
(d) An adduct prepared by m-xylenediamine and methyl methacrylate The combination and composition of the ingredients of each Example are listed in Table 1. Tests were conducted as generally described in Example 1 and the results are shown in Table 5.

EXAMPLES 8 to 11

A mixture was prepared by mixing 60 parts by weight of an epoxy resin (Epicoat EP-828 available from Uka Shell Co., Ltd.) and 40 parts by weight of a monofunctional (meth)acrylate listed in Table 4. The mixture was then mixed with the curing agent of Example 1 to form a curable epoxy resin composition. Tests were conducted as generally described in Example 1 and the results are shown in Table 5.

COMPARATIVE EXAMPLE 1

A curable epoxy resin composition was prepared by mixing 60 parts by weight of an epoxy resin (Epicoat EP-828) and 25 parts by weight of m-xylenediamine.

The resulting composition was cured as generally described in Example 1, but a cured article was not obtained. It was further cured at 23±1° C. for another four days. The obtained cured article was subjected to the measurement of water absorption as generally described in Example 1 and the results are shown in Table 5. Test pieces using the curable epoxy resin composition as an adhesive composition were prepared as generally described in Example 1. The tensile shear adhesive strength and T peel strength were measured as generally described in Example el with the exception that the test pieces were held for 7 days at 23±1° C., and the results are shown in Table 5.

COMPARATIVE EXAMPLE 2

A mixture was prepared by mixing 60 parts by weight of an epoxy resin (Epicoat EP-828) and 40 parts by weight of polyethyleneglycol diacrylate of which polyethylene glycol had an average molecular weight of 200. It was then mixed with the amine curing agent (b) of Example 2 to obtain a curable epoxy resin composition.

The resulting composition was cured as generally described in Example 1, but a cured article was not obtained. It was further cured at 23±1° C. for another four days. The obtained cured article was subjected to the measurement of water absorption as generally described in Example 1 and the results are shown in Table 5. Test pieces using the curable epoxy resin composition as an adhesive composition were prepared as generally described in Example 1. The tensile shear adhesive strength and T peel strength were measured as generally described in Example 1 with the exception that the test pieces were held for 7 days at 23±1° C., and the results are shown in Table 5.

COMPARATIVE EXAMPLE 3

Tests were conducted as generally described in Example 1 with the exception that 21.7 parts by weight of bis(aminopropyl)piperadine was employed instead of 25 parts by weight of polyamideamine. The results are shown in Table 5.

EXAMPLE 12

Tests were conducted as generally described in Example 1 with the exception that 15.9 parts by weight of 1,3-bis(aminomethyl)cyclohexane was employed instead of 25 parts by weight of polyamideamine. The results are shown in Table 5.

TABLE 1

| Examples | Charge A or B | Curing agent (parts by weight) |
|---|---|---|
| 2 | A | c (19) |
| 3 | A | d (21) |
| 4 | B | a (20) |
| 5 | B | b (16) |
| 6 | B | c (12) |
| 7 | B | d (13) |

TABLE 2

| Plate | Surface treatment |
|---|---|
| SPCC-B Steel plate (1.6 mm thickness) | #240 Sand blast + trichloroethylene degreasing |
| Aluminum plate (2.0 mm thickness) | #240 Sand blast + chromic acid mixture treatment |
| Tough pitch copper plate (1.6 mm thickness) | #240 Sand blast + ferric chloride/nitric acid treatment |
| Unsaturated polyester FRP plate (2.0 mm thickness) | #400 Sand blast + acetone degreasing |
| Polycarbonate plate (2.0 mm thickness) | #400 Abrasive paper + methanol degreasing |
| Nitrile rubber plate (5.0 mm thickness) | A-80 Abrasive paper + acetone degreasing |

TABLE 3

| Plate | Surface treatment |
|---|---|
| SPCC-B Steel plate (25.0 × 150 × 0.4 mm) | Methanol degreasing |
| Aluminum plate (150 × 150 × 0.2 mm) | Methanol degreasing |
| Tough pitch copper plate (150 × 150 × 0.2 mm) | Methanol degreasing |

TABLE 4

| Examples | Monofunctional acrylate | Amount of Curing agent (parts by weight) |
|---|---|---|
| 8 | 2-(4-Nonylphenoxy)ethyl acrylate | 15 |
| 9 | 2-Phenoxyethyl acrylate | 18.5 |
| 10 | 2-(2-Phenoxyethoxy)ethyl acrylate | 16.7 |
| 11 | 2-(4-Methylphenoxy)ethyl acrylate | 17.6 |

TABLE 5

| | Water absorption (%) | Tensile shear adhesive strength (Kgf/cm$^2$) | | | | | | T peel strength (Kgf/25 mm) | |
|---|---|---|---|---|---|---|---|---|---|
| Examples | | SPCC-B steel | Al | Tough pitch copper | Polyester FRP | Polycarbonate | Nitrile rubber | SPCC-B steel | Al |
| Comparative Examples | | | | | | | | | |
| 1 | 0.3 | 28 | 24 | 19 | 13 | 12 | 1.3 | 0.4 | *2 |
| 2 | 23 | 45 | 45 | 40 | 58 | — | 1.4 | 5.6 | 1.2 |
| 3 | 2.1 | 94.7 | 72.1 | 84.1 | 31.9 | 21.1 | 1.9 | 4.2 | 1.9 |
| Examples | | | | | | | | | |
| 1 | 0.25 | 163 | 191 | 135 | *1 | 39 | *1 | 0.6 | 0.4 |
| 2 | 0.26 | 141 | 112 | 121 | *1 | 48 | *1 | 0.9 | 0.6 |
| 3 | 0.25 | 147 | 151 | 143 | *1 | 55 | *1 | 0.4 | 0.9 |
| 4 | 0.11 | 201 | 169 | 111 | *1 | 49 | *1 | 1.8 | 0.6 |
| 5 | 0.19 | 211 | 131 | 203 | *1 | 52 | *1 | 1.3 | 1.2 |
| 6 | 0.20 | 186 | 99 | 160 | *1 | 26 | *1 | 1.9 | 0.6 |
| 7 | 0.15 | 191 | 131 | 172 | *1 | 37 | *1 | 4.9 | 4.0 |
| 8 | 0.15 | 218 | 145 | 178 | *1 | 42 | *1 | 5.4 | 3.5 |
| 9 | 0.17 | 111 | 122 | 133 | *1 | 46 | *1 | 1.33 | 1.6 |
| 10 | 0.25 | 192 | 154 | 188 | *1 | 50 | *1 | 4.0 | 4.0 |
| 11 | 0.30 | 110 | 102 | 141 | *1 | 35 | *1 | 4.4 | 3.7 |
| 12 | 0.17 | 169 | 103 | 166 | *1 | 45.5 | *1 | 1.4 | 1.6 |

*1 Mother plate was ruptured.
*2 Strength did not appear.

The curable epoxy resin composition of the present invention is cured in a short period of time at ambient temperature. The cured article has excellent adhesive performance and water resistance.

The adhesive composition of the present invention is composed of the above curable epoxy resin composition and exhibits high reliability to constructive members.

What is claimed is:

1. A curable epoxy resin composition comprising;
   (a) an epoxy resin having at least two epoxy groups in one molecule,
   (b) a monofunctional (meth)acrylate represented by

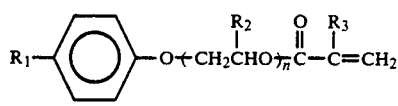

wherein $R_1$ represents a hydrogen atom or an alkyl group having 1 to 12 carbon atoms, $R_2$ and $R_3$ respectively represent a hydrogen atom or a methyl group, and n is an integer of 1 to 4, and
   (c) An amine curing agent selected from the group consisting of an aromatic polyamine, a modified aromatic polyamine, a polyamideamine and a mixture thereof.

2. The composition according to claim 1 wherein said epoxy resin includes bisphenol A epoxy resin, bisphenol AD epoxy resin, bisphenol F epoxy resin, phenol novolac type epoxy resin, cresol novolac epoxy resin on a mixture thereof.

3. The composition according to claim 1 wherein said alkyl group having 1 to 12 carbon atoms represented by $R_1$ in the formula (I) includes methyl, ethyl, propyl, butyl, pentyl, hexyl, heptyl, octyl, nonyl, decyl, undecyl dodecyl, which can be linear or branched.

4. The composition according to claim 1 wherein said monofunctional (meth)acrylates represented by the formula (I) includes 2-phenoxyethyl (meth)acrylate, 2-(2-phenoxyethoxy)ethyl (meth)acrylate, 2-[2-(2-phenoxyethoxy)ethoxy]ethyl (meth)acrylate, 2-[2-[2-(2-phenoxyethoxy)ethoxy]ethoxy]ethyl (meth)acrylate, 2-(4-methylphenoxy)ethyl (meth)acrylate, 2-[2-(4-methylphenoxy)ethoxy]ethyl (meth)acrylate, 2-[2-[2-(4-methylphenoxy)ethoxy]ethoxy]ethyl (meth)acrylate, 2-[2-[2-[2-(4-methylphenoxy)ethoxy]ethoxy]ethoxy]ethyl (meth)acrylate, 2-(4-nonylphenoxy)ethyl (meth)acrylate, 2-[2-(4-nonylphenoxy)ethoxy[ethyl (meth)acrylate, 2-[2-[2-(4-nonylphenoxy)ethoxy[ethoxy[ethyl (meth)acrylate, 2-[2-[2-[2-(4-nonylphenoxy)ethoxy[ethoxy[ethyl (meth)acrylate and a mixture thereof.

5. The composition according to claim 1 wherein said monofunctional (meth)acrylate represented by the formula (I) is present in the composition in an amount of b 15 to 150 parts by weight, based on 100 parts by weight of the epoxy resin.

6. The composition according to claim 1 wherein said amine curing agent is m-xylenediamine, hydrogenated m-xylenediamine, a modified m-xylenediamine, a polyamideamine prepared from m-xylenediamine and dimer acid or a mixture thereof.

7. The composition according to claim 1 wherein said amine curing agent is present in the composition in an amount of 60 to 150 equivalent %, based on the total amount of the epoxy equivalent of the epoxy resin and the (meth)acrylate equivalent of the monofunctional acrylate.

8. The composition according to claim 1 further comprising additives.

9. The composition according to claim 8 wherein said additives include a filler, a thickener, a leveling agent or a mixture thereof.

10. An adhesive composition comprising the curable epoxy resin composition according to claim 1.

* * * * *

UNITED STATES PATENT AND TRADEMARK OFFICE
CERTIFICATE OF CORRECTION

PATENT NO. : 5,180,792
DATED : January 19, 1993
INVENTOR(S) : TETUZI TAKATA and NOBUO GOTOH It is certified that error appears in the above-identified patent and that said Letters Patent is hereby corrected as shown below:

On the title page, under item [19] and item [75], "Takada" should read

--Takata--.

Signed and Sealed this

Twenty-third Day of November, 1993

Attest:

BRUCE LEHMAN

Attesting Officer     Commissioner of Patents and Trademarks